(12) United States Patent
Uno

(10) Patent No.: US 10,908,594 B2
(45) Date of Patent: Feb. 2, 2021

(54) NUMERICAL CONTROLLER

(71) Applicant: Fanuc Corporation, Yamanashi (JP)

(72) Inventor: Kousuke Uno, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/425,284

(22) Filed: May 29, 2019

(65) Prior Publication Data

US 2019/0369603 A1 Dec. 5, 2019

(30) Foreign Application Priority Data

Jun. 4, 2018 (JP) .................................. 2018-106973

(51) Int. Cl.
*G05B 19/416* (2006.01)
*G05B 19/18* (2006.01)

(52) U.S. Cl.
CPC ....... *G05B 19/4163* (2013.01); *G05B 19/182* (2013.01); *G05B 2219/41006* (2013.01); *G05B 2219/41166* (2013.01); *G05B 2219/49077* (2013.01); *G05B 2219/49108* (2013.01)

(58) Field of Classification Search
CPC .............. G05B 19/4163; G05B 19/182; G05B 2219/41166; G05B 2219/49108; G05B 2219/41006; G05B 2219/49077; G05B 2219/42033; G05B 19/19; G05B 2219/35349

See application file for complete search history.

(56) References Cited

U.S. PATENT DOCUMENTS

| | | | | |
|---|---|---|---|---|
| 3,784,798 A | * | 1/1974 | Beadle | G05B 19/4163 700/173 |
| 5,187,669 A | * | 2/1993 | Wildes | G05B 19/18 700/175 |
| 5,727,912 A | | 3/1998 | Rubashkin et al. | |
| 6,241,435 B1 | * | 6/2001 | Huang | B23Q 5/225 318/575 |
| 2007/0035870 A1 | * | 2/2007 | Chang | G11B 5/59644 360/75 |
| 2008/0019782 A1 | * | 1/2008 | Imai | B23B 29/125 407/11 |
| 2014/0217952 A1 | * | 8/2014 | Miyaji | G05B 5/01 318/611 |
| 2015/0346707 A1 | * | 12/2015 | Haga | G05B 19/182 700/160 |

FOREIGN PATENT DOCUMENTS

JP 9-500331 A 1/1997

* cited by examiner

*Primary Examiner* — Ziaul Karim
(74) *Attorney, Agent, or Firm* — RatnerPrestia

(57) ABSTRACT

A numerical controller includes: a vibration amplitude specifying unit for specifying an amplitude of a vibration component generated by a blade of a tool being brought into contact with a workpiece at a predetermined cycle, due to rotation of a spindle out of a spindle load; a gain calculating unit for calculating a gain of PID control such that an output of the feed speed is uninfluenced by the amplitude, based on the amplitude of the vibration component specified by the vibration amplitude specifying unit; and a speed control unit for outputting a feed speed of the spindle controlled by the PID control, by using the gain calculated by the gain calculating unit.

7 Claims, 4 Drawing Sheets

NUMERICAL CONTROLLER

RELATED APPLICATION

The present application claims priority to Japanese Application Number 2018-106973 filed Jun. 4, 2018, the disclosure of which is hereby incorporated by reference herein in its entirety.

BACKGROUND OF THE INVENTION

1. Field of the Invention

The present disclosure relates to a numerical controller, and in particular, to a numerical controller for automatically adjusting a setting value.

2. Description of the Related Art

In a related art, there is disclosed a technique for shortening a cycle time in rough processing and prolonging a life time of a cutting tool, by controlling a feed speed such that a load of the spindle becomes constant (for example, see JP 09-500331 A and the like). Various methods of controlling the feed speed may be considered, but in general, PID control is widely used as control for maintaining a target value at a constant value. It is possible to generally calculate an output by the PID control using the following Expression 1, and it is possible to perform control such that the load of the spindle becomes stably constant while rapidly following to processing conditions, by setting each gain of a gain $K_p$ of a proportional term, a gain $K_i$ of an integral term, and a gain $K_d$ of a differential term to an appropriate value.

$$O(t) = K_p e_L(t) + \int_{t_0}^{t} K_i e_L(t) dt + k_d \frac{d}{dt} e_L(t) + C \qquad \text{[Expression 1]}$$

O(t): Output value
$e_L(t)$: Difference between a target to be controlled and a current value (at time t)
$K_p$: Gain of the proportional term of the PID control
$K_i$: Gain of the integral term of the PID control
$K_d$: Gain of the differential term of the PID control
C: Offset of the PID control FIG. 3 is a diagram illustrating an example of a control block diagram of the PID control. In the PID control of performing control such that the spindle load becomes constant, in a case where feedback control illustrated in FIG. 3 is applied to a machine tool for performing numerical control, for each control cycle of the feedback control, the output value O(t) for the current control cycle is calculated and controlled according to a target spindle load and a feedback L(t) of the spindle load due to actual processing. Incidentally, a filter to which the feedback L(t) is input is inserted to reduce noise included in the feedback L (t).

The load variation of the spindle has a component due to a variation in a cutting volume and a component due to spindle rotation, and there is a possibility that the component due to the spindle rotation induces a vibration in control. For example, as illustrated in the upper portion of FIG. 4, it is considered to perform processing of a workpiece by moving the spindle to a direction of the workpiece, in a state where the tool attached to the spindle is rotated. At this time, when assuming that the tool is brought into contact with the workpiece at the time point of a second (zero seconds), the workpiece is processed, and the tool comes out of the workpiece at the time point of b seconds, there is illustrated a graph in the lower portion of FIG. 4, in which a relationship between time (sec) and spindle load (%) is represented, and in that graph, the spindle load (the spindle load fed back in the PID control) is indicated by black thin lines and in the middle of thin lines, a component of the spindle load due to the variation in a cutting volume is indicated by a white thick dotted line.

In the graph illustrated in the lower portion of FIG. 4, a difference between the black thin lines and the white thick dotted line is a component of the spindle load due to the spindle rotation. The component of the spindle load due to the spindle rotation is generated by a difference between a load when a blade of the tool being attached to the spindle and rotated is brought into contact with the workpiece and a load when the blade of the tool being attached to the spindle and rotated is not contact with the workpiece, and is a vibration component at frequency depending on the number of blades of the tool and the number of revolution of the spindle. Then, since the component of the spindle load due to the spindle rotation is added to a feedback value as noise, a vibration is generated also in an override (in this case, feed speed) that is the output value of the PID control, so that there has been a problem that the stability in control is not maintained. Although it is possible to reduce this vibration to some extent by setting a filter illustrated in FIG. 3, in a case where it is attempted to reduce the frequency component of noise by the filter, a response speed of the filter becomes a problem, and the response speed of the PID control itself decreases, so there is a problem that it is impossible to introduce a filter for easily reducing the frequency component of noise.

SUMMARY OF THE INVENTION

Therefore, an object of the present disclosure is to provide a numerical controller capable of performing PID control such that the feed speed is uninfluenced by the vibration component due to the spindle rotation.

The numerical controller of the present disclosure deals with the above problem by measuring or predicting such a component to induce a vibration, and setting a gain such that the output of the PID control is uninfluenced by influence of the vibration.

Then, according to one aspect of the present disclosure, there is provided a numerical controller for controlling a machine tool for processing a workpiece by a tool attached to a spindle based on a processing program, and performing PID control of a feed speed such that a spindle load becomes constant, the numerical controller including: a vibration amplitude specifying unit for specifying an amplitude of a vibration component generated by a blade of the tool being brought into contact with the workpiece at a predetermined cycle, due to rotation of the spindle out of the spindle load, a gain calculating unit for calculating a gain of the PID control such that an output of the feed speed is uninfluenced by the amplitude, based on the amplitude of the vibration component specified by the vibration amplitude specifying unit; and a speed control unit for outputting the feed speed of the spindle controlled by the PID control, by using the gain calculated by the gain calculating unit.

According to the present disclosure, it is possible to automatically set the gain according to the machine tool and the processing, so that the stability of the movement of the spindle is improved by the PID control based on the set gain, and effects of suppressing a vibration in the machine and prolonging a life time of the tool life are expected. Also, since the setting of the gain is automatically performed, it is expectable to reduce necessary know-how and effort by simplifying the setting.

BRIEF DESCRIPTION OF THE DRAWINGS

The foregoing and other objects and features of the present disclosure will become apparent from the following description of embodiments with reference to the accompanying drawings. Of those figures.

DETAILED DESCRIPTION OF THE PREFERRED EMBODIMENTS

Hereinafter, embodiments of the present disclosure will be described with reference to the drawings.

Figure 1:
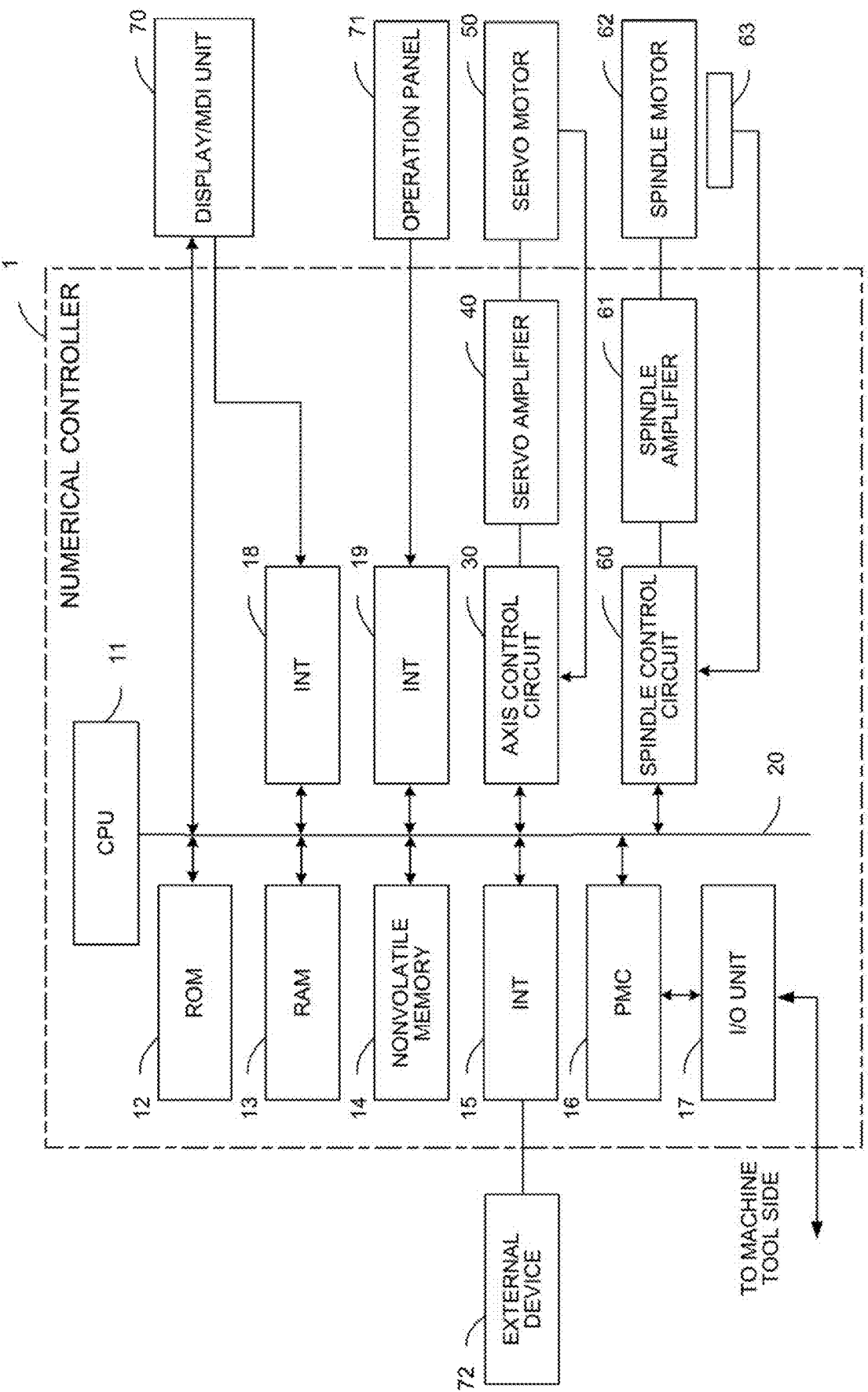
FIG. 1 is a schematic hardware configuration diagram of a numerical controller according to an embodiment.

FIG. 1 is a schematic hardware configuration diagram illustrating a main part of a numerical controller according to an embodiment of the present disclosure.

A CPU 11 included in a numerical controller 1 according to the present embodiment is a processor that controls the numerical controller 1 as a whole. The CPU 11 read, through a bus 20, a system program stored in a ROM 12, and controls the entire numerical controller 1 according to the system program. Temporary calculation data and display data, various data input by an operator through an input unit (not illustrated), and the like are temporarily stored in a RAM 13.

A nonvolatile memory 14 is configured as a memory in which a stored state is maintained, for example, by being backed up by a battery (not illustrated), and the like even when a power supply of the numerical controller 1 is turned off. The nonvolatile memory 14 stores a control program read from an external device 72 through an interface 15, a control program input through a display/MDI unit 70, and various data acquired from each unit of the numerical controller 1, the machine tool, a sensor, and the like. The control program and various data stored in the nonvolatile memory 14 may be developed in the RAM 13 at run time or in use. Also, in the ROM 12, various system programs such as known analysis programs are written in advance.

The interface 15 is an interface for connecting the numerical controller 1 and the external device 72 such as a USB device. The control program, various parameters, and the like are read from an external device 72 side. It is possible to store the control program, various parameters, and the like edited in the numerical controller 1 into external storage means, through the external device 72. A programmable machine controller (PMC) 16 outputs signals to the machine tool and peripheral devices of the machine tool (for example, an actuator such as a robot hand for changing a tool, a sensor attached to the machine tool, or the like) through an I/O unit 17 and controls the machine tool and peripheral devices, by a sequence program incorporated in the numerical controller 1. Also, the PMC 16 receives signals from various switches or peripheral devices on an operation panel provided in the main body of the machine tool, and forwards the signals to the CPU 11 after performing necessary signal processing thereon.

The display/MDI unit 70 is a manual data input apparatus including a display, a keyboard, and the like, and an interface 18 receives commands and data from the keyboard of the display/MDI unit 70 and forwards the commands and data to the CPU 11. An interface 19 is connected to an operation panel 71 having a manual pulse generator or the like used for manually driving each axis.

An axis control circuit 30 for controlling the axes included in the machine tool receives a command of the movement amount of an axis from the CPU 11, and outputs the command of the axis to a servo amplifier 40. In response to this command, the servo amplifier 40 drives a servo motor 50 for moving the axis included in the machine tool. The servo motor 50 of the axis incorporates a position and speed detector, and feedbacks position and speed feedback signals from the position and speed detector to the axis control circuit 30 to perform feedback control of the position and speed. In the hardware configuration diagram of FIG. 1, only one axis control circuit 30, servo amplifier 40, and servomotor 50 are illustrated, but actually the axis control circuit 30, servo amplifier 40, and servo motor 50 are prepared corresponding to the number of axes included in the machine tool to be controlled.

A spindle control circuit 60 receives a spindle rotation command and outputs a spindle speed signal to a spindle amplifier 61. The spindle amplifier 61 receives the spindle speed signal, and rotates a spindle motor 62 of the machine tool at a commanded rotational speed to drive the tool. A position coder 63 is coupled to the spindle motor 62, the position coder 63 outputs a feedback pulse in synchronization with the rotation of the spindle, and the feedback pulse is read by the CPU 11.

Figure 2:
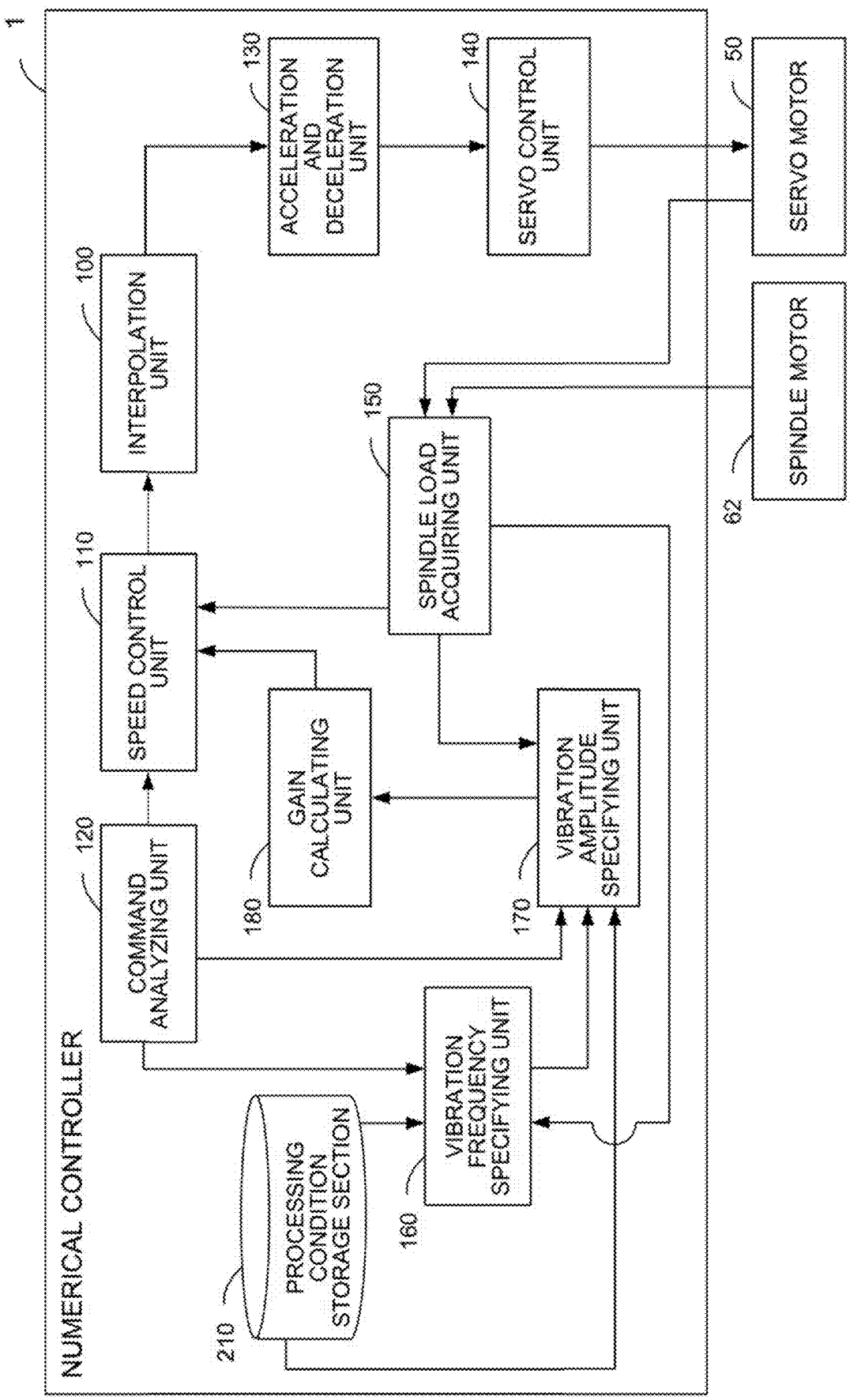
FIG. 2 is a schematic functional block diagram of a numerical controller according to an embodiment.

FIG. 2 is a schematic functional block diagram of the numerical controller 1 according to an embodiment. Each function block illustrated in FIG. 2 is implemented by the CPU 11 included in the numerical controller 1 illustrated in FIG. 1 allowing each system program to be executed and the operation of each unit of the numerical controller 1 to be controlled.

The numerical controller 1 according to the present embodiment includes a command analyzing unit 100, a speed control unit 110, an interpolation unit 120, an acceleration and deceleration unit 130, a servo control unit 140, a spindle load acquiring unit 150, a vibration frequency specifying unit 160, a vibration amplitude specifying unit 170, and a gain calculating unit 180, and the nonvolatile memory 14 is provided with a processing condition storage section 210 that is an area for storing a processing condition related to processing of a workpiece by the control program.

The command analyzing unit 100 sequentially reads and analyzes blocks for commanding the movement of a machine to be controlled from the control program and the like stored in the nonvolatile memory 14, generates command data for commanding the movement of an axis driven by the servo motor 50 based on the analysis results, and outputs the generated command data to the speed control unit 110.

Figure 3:
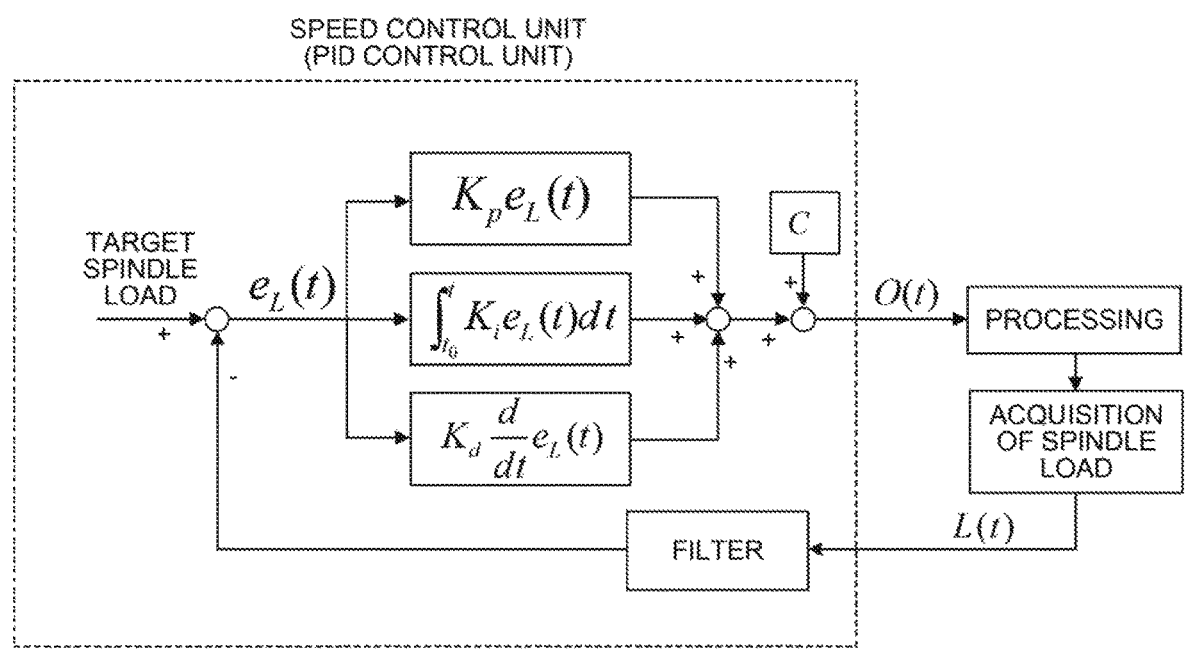
FIG. 3 is a diagram illustrating a control block diagram of PID control according to a technique in the related art.
Figure 4:
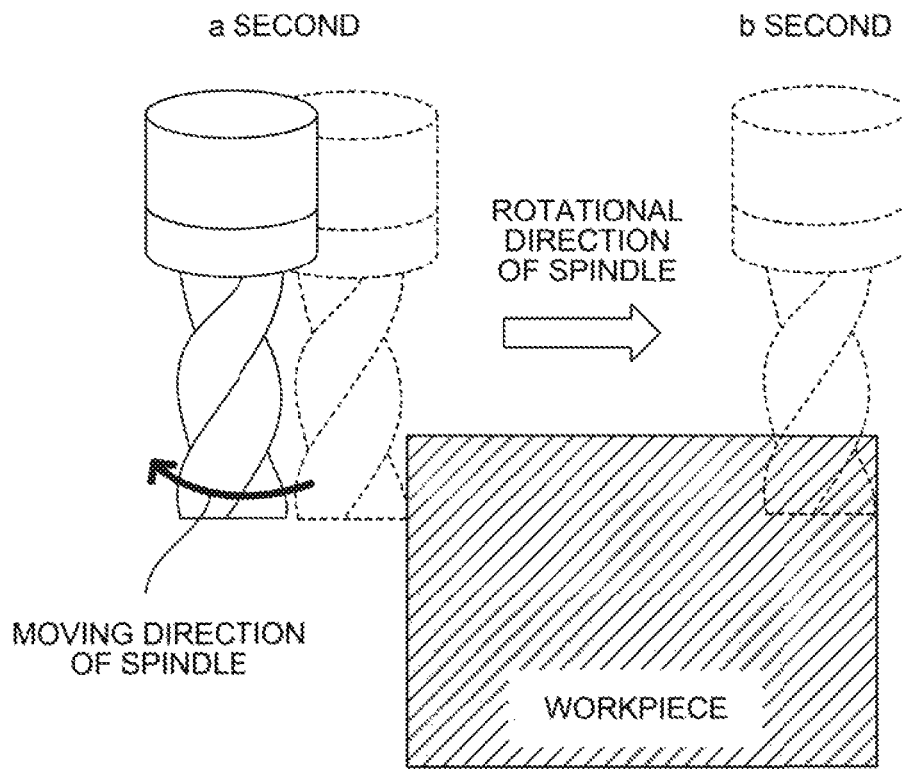
FIG. 4 is a diagram for describing the components of a spindle load during processing.
Figure 4:
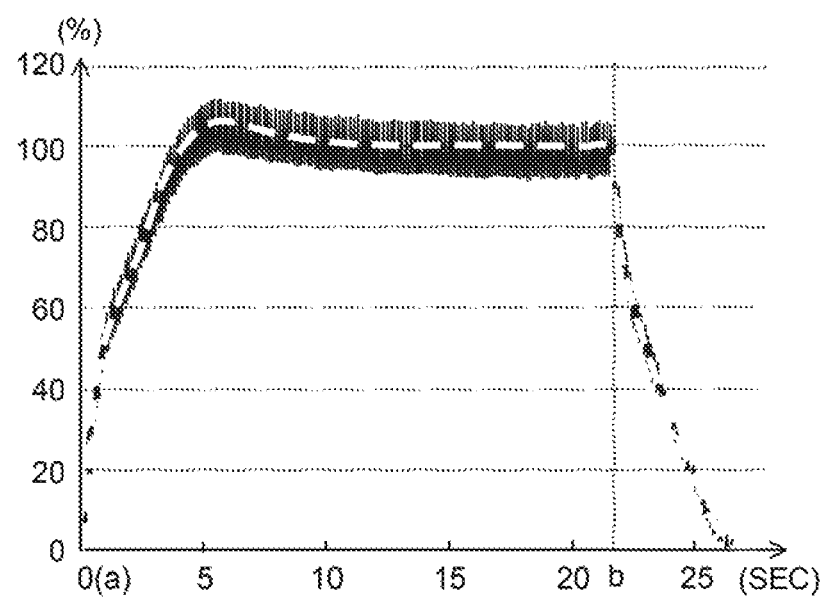

Based on a spindle load of the spindle motor 62 acquired by the spindle load acquiring unit 150, the speed control unit 110 calculates an override of the feed speed of the command data input from the command analyzing unit 100 such that the spindle load becomes constant, and outputs command data of which the speed has been adjusted based on the calculated override, to the interpolation unit 120. The speed control unit 110 is configured to perform speed control for maintaining the spindle load constant (for example, as illustrated in FIG. 3).

Based on the speed-adjusted command data input from the speed control unit 110, the interpolation unit 120 generates interpolation data as a point on a command path for each interpolation cycle according to the command data, and outputs the point to the acceleration and deceleration unit 130.

The acceleration and deceleration unit 130 calculates a speed of each axis for each interpolation period based on the interpolation data input from the interpolation unit 120, and outputs result data to the servo control unit 140.

Then, based on the output of the acceleration and deceleration unit 130, the servo control unit 140 controls the servo motor 50 for driving an axis of the machine to be controlled.

The spindle load acquiring unit 150 acquires a spindle load value measured by a sensor (not illustrated) attached to the spindle motor 62 or an estimated spindle load value obtained by measuring a current value and the like flowing through the servo motor 50. The spindle load value acquired by the spindle load acquiring unit 150 is used in the speed control unit 110, the vibration frequency specifying unit 160, the vibration amplitude specifying unit 170, and the like.

The vibration frequency specifying unit 160 is a function unit for specifying a frequency H of a vibration component due to the spindle rotation of the spindle load. For example, based on the processing condition acquired from the processing condition storage section 210 and the command data acquired from the command analyzing unit 100, the vibration frequency specifying unit 160 may specify the number $N_b$ of blades of the tool attached to the spindle and a rotational speed S (min$^{-1}$) of the spindle, and specify a frequency H (Hz) of the vibration component due to the spindle rotation of the spindle load, by performing calculation using the following Expression 2, based on the specified number of blades of the tool and the rotational speed of the spindle. However, the frequency H may be calculated by performing calculation using Expression 3, taking into consideration that the rotation symmetry of the tool is disrupted due to influence of eccentricity of the spindle, tool wear, lacking, and the like, and a frequency component of the spindle rotation increases. Also, for example, the vibration frequency specifying unit 160 performs frequency analysis on the time series data of the spindle load value acquired by the spindle load acquiring unit 150 such that the frequency H of the vibration component due to the spindle rotation of the spindle load may be specified.

$$H = \frac{N_b S}{60} \qquad \text{[Expression 2]}$$

$$H = \frac{S}{60} \qquad \text{[Expression 3]}$$

The vibration amplitude specifying unit 170 is a function unit for specifying an amplitude value W of the vibration component due to the spindle rotation of the spindle load. For example, based on the processing condition acquired from the processing condition storage section 210 and the command data acquired from the command analyzing unit 100, the vibration amplitude specifying unit 170 may specify a material of the workpiece (degree of the hardness of the workpiece), a cutting depth, a cutting width (or a tool diameter), a feed speed of the spindle, and specify an amplitude value W of the vibration component due to the spindle rotation of the spindle load based on the specified number of blades of the tool and the rotational speed of the spindle. In a case where such a method is adopted, experiments or the like are performed in advance, and a relationship between the cutting depth, the cutting width (or the tool diameter), and the feed speed of the spindle for each workpiece material, and the amplitude value W of the vibration component due to the spindle rotation of the spindle load is obtained according to a known method such as multivariate analysis, but the amplitude value W may be measured under specific conditions used in the processing of a target to which a function is applied. Also, for example, the vibration amplitude specifying unit 170 may specify the amplitude value W of the vibration component due to the spindle rotation of the spindle load, by performing frequency analysis on the time series data of the spindle load value acquired by the spindle load acquiring unit 150.

After specifying the amplitude value W of the vibration component due to the spindle rotation of the spindle load specified as described above, the vibration amplitude specifying unit 170 obtains how much the amplitude is reduced when passing through a filter (corresponding to a filter of the control block diagram in FIG. 3) within the speed control unit 110, and outputs an obtained amplitude value $W_f$ after reduction, to the gain calculating unit 180. When obtaining the amplitude value $W_f$ after the reduction, the vibration amplitude specifying unit 170 uses the characteristics (depending on a type and parameters of the filter) of the filter within the speed control unit 110 set in advance, the frequency H of the vibration component due to the spindle rotation of the spindle load specified by the vibration frequency specifying unit 160, and the amplitude value W of the vibration component due to the spindle rotation of the spindle load specified as described above. For example, in a case where the amplitude value W of the vibration component is reduced by 20% due to the characteristics of the filter, a value of 0.8 W may be output as the amplitude value $W_f$ after the reduction. Incidentally, in a case where the speed control unit 110 does not have a configuration corresponding to the filter of the control block diagram of FIG. 3, the above processing is unnecessary.

Based on the amplitude value $W_f$ (after the reduction by the filter) of the vibration component due to the spindle rotation input from the vibration amplitude specifying unit 170, the gain calculating unit 180 sets a gain (a proportional gain $K_p$, and a further integration gain $K_i$ as necessary illustrated in FIG. 3) within the speed control unit 110. For example, the gain calculating unit 180 sets a maximum. $K_p$ that is calculated by using Expression 4 illustrated below.

Regarding a constant $K_m$ in Expression 4, experiments or the like are performed in advance, and a value may be obtained and set such that the feed speed output from the speed control unit 110 is uninfluenced by the vibration component due to the spindle rotation of the spindle load at a predetermined amplitude value $W_f$.

$$K_p \leq \frac{K_m}{W_f} \qquad \text{[Expression 4]}$$

After setting the proportional gain $K_p$ according to the above method, in a case where the feed speed output from the speed control unit 110 is influenced by the vibration component due to the spindle rotation of the spindle load, the gain calculating unit 180 further needs to lower a value of the integration gain $K_i$ to a value at which the feed speed is uninfluenced by the vibration component. Since an integral component of the PID control indicates the same frequency characteristic as a first-order filter, it is possible to estimate an amplitude of a component due to the spindle rotation reflected on an output, similarly to the filter within the speed control unit 110, and it is possible to set the integral gain $K_i$, similarly to the above proportional gain $K_p$.

In the numerical controller 1 having the above configuration, a gain is automatically adjusted based on a vibration component due to the spindle rotation of the spindle load such that an output of the PID control is uninfluenced by the vibration component. Therefore, the stability of the movement of the spindle is further improved and effects of suppressing the vibration in the machine and prolonging the life time of the tool are expected, as compared to the PID control in the related art without taking into consideration the vibration component due to the spindle rotation of the spindle load.

As described above, although the embodiments of the present disclosure have been described, the present disclosure is not only limited to examples of the aforementioned embodiments, and may be implemented in various forms by applying appropriate modifications thereto.

The invention claimed is:

1. A numerical controller for controlling a machine tool for processing a workpiece by a tool attached to a spindle based on a processing program, and performing proportional-integral-derivative (PID) control of a feed speed such that a spindle load becomes constant, the numerical controller comprising:
a processor configured to:
specify an amplitude of a vibration component generated by a blade of the tool being brought into contact with the workpiece at a predetermined cycle, due to rotation of the spindle out of the spindle load;
calculate a gain of the PID control such that an output of the feed speed is uninfluenced by the amplitude, based on the amplitude of the vibration component specified;
output the feed speed of the spindle controlled by the PID control, by using the calculated gain;
specify a frequency of the vibration component; and
specify an amplitude of the vibration component in consideration of a reduction in feedback of the amplitude of the vibration component, based on the frequency specified.

2. The numerical controller according to claim 1, wherein the processor is further configured to calculate a gain of the proportional term of the PID control.

3. The numerical controller according to claim 2, wherein the processor is further configured to calculate a gain of the integral term of the PID control, in a case where the influence of the amplitude of the vibration component is unable to be suppressed on an output of the feed speed, only by changing the gain of the proportional term.

4. The numerical controller according to claim 1, wherein the processor is further configured to:
store a processing condition for processing by the machine tool, and
specify a frequency of the vibration component, based on a processing condition stored and a command by the processing program.

5. The numerical controller according to claim 1, wherein the processor is further configured to specify a frequency of the vibration component, based on a measured spindle load.

6. The numerical controller according to claim 1, wherein the processor is further configured to:
store a processing condition for processing by the machine tool, and
specify an amplitude of the vibration component, based on a processing condition and a command by the processing program.

7. The numerical controller according to claim 1, wherein the processor is further configured to specify an amplitude of the vibration component, based on a measured spindle load.

* * * * *